United States Patent [19]
Keeler et al.

[11] Patent Number: 5,343,284
[45] Date of Patent: Aug. 30, 1994

[54] IMAGING LIDAR SYSTEM EMPLOYING BISTATIC OPERATION

[75] Inventors: R. Norris Keeler, McLean, Va.; Bobby L. Ulich, Tucson, Ariz.

[73] Assignee: Kaman Aerospace Corporation, Bloomfield, Conn.

[21] Appl. No.: 968,940

[22] Filed: Oct. 22, 1992

Related U.S. Application Data

[63] Continuation-in-part of Ser. No. 602,727, Oct. 24, 1990, abandoned.

[51] Int. Cl.$^5$ .......................... G01C 3/08; H04N 7/18
[52] U.S. Cl. .......................................... 356/5; 348/31; 348/81; 348/144
[58] Field of Search .................. 358/95, 99, 100, 109; 356/5

[56] References Cited

U.S. PATENT DOCUMENTS

| | | | |
|---|---|---|---|
| 3,527,881 | 4/1970 | Blanchard | 358/95 |
| 3,895,388 | 7/1975 | Townsend | 358/95 |
| 3,934,077 | 1/1976 | Wood et al. | 358/95 |
| 4,143,400 | 3/1979 | Heckman, Jr. et al. | 358/95 |
| 4,174,524 | 11/1979 | Moran | 358/95 |
| 4,862,257 | 8/1989 | Ulich | 358/95 |
| 4,967,270 | 10/1990 | Ulich et al. | 358/95 |

OTHER PUBLICATIONS

"Blue-Green High-Powered Light Extends Under Water Visibility", Kornstein et al, Electronics, Oct. 14, 1968, pp. 140-149.

*Primary Examiner*—Stephen C. Buczinski
*Attorney, Agent, or Firm*—Fishman, Dionne & Cantor

[57] ABSTRACT

An imaging lidar system is presented which is adapted to decrease the backscattering at the receiver when a target is viewed in reflection and to increase the backscattered reflection when the target is viewed in obscuration by operating the airborne lidar imaging system bistatically in the former case, and monostatically in the latter case. In accordance with a first embodiment of the present invention, a retractible prism and remote reflecting mirror are used to direct the laser transmitter beam downward. The reflecting mirror is offset so that there is a finite angle between the transmitter optical path and the path of the light reflected back into the CCD framing camera. The angle can be varied by moving the reflecting mirror along a track or rail with the appropriate adjustment to the mirror so that the transmitter beam is completely captured and directed downward to illuminate the area viewed by the camera. In a second embodiment of the present invention, the camera is placed on runners and displaced from the transmitter beam. A control is inserted so that the transmitter optics are directed to the area imaged by the camera.

20 Claims, 8 Drawing Sheets

IMAGING LIDAR SYSTEM EMPLOYING BISTATIC OPERATION

CROSS-REFERENCE TO RELATED APPLICATION

This application is a continuation-in-part of U.S. application Ser. No. 602,727 filed Oct. 24, 1990, now abandoned.

BACKGROUND OF THE INVENTION

This invention relates generally to a sensor system for remote detection and imaging of objects in a backscattering medium such as air or water. More particularly, this invention relates to a method and apparatus for detecting, locating and/or imaging underwater objects such as mines and submarines from an airborne platform using a novel imaging lidar (light detection and ranging) system which employs a method for improving the imaging of targets being viewed in reflection using bistatic operation of the imaging lidar system.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging. An important and novel system for remote detection and imaging of objects underwater (or objects obscured by other backscattering media which are at least partially transmitting to light such as ice, snow, fog dust and smoke) from an airborne platform has been described in U.S. Pat. Nos. 4,862,257 and 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,417 relates to an imaging lidar system intended for night vision.

Imaging lidar systems of the type described hereinabove are also disclosed in commonly assigned U.S. Pat. Nos. 4,964,721 and 4,967,270, both of which are incorporated herein by reference. U.S. Pat. No. 4,964,721 relates to an imaging lidar system which controls camera gating based on input from the aircraft onboard altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

U.S. Ser. No. 565,631 filed Aug. 10, 1990 which is also assigned to the assignee-hereof and fully incorporated herein by reference, relates to an airborne imaging lidar system which employs multiple pulsed laser transmitters, multiple gated and intensified array camera receivers, an optical scanner for increased field of regard, and a computer for system control, automatic target detection and display generation. U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

In accordance with the imaging lidar systems of the type described above, targets are detected by their contrast with the light scattered or reflected back from the surroundings. If the target falls within a gate, it will be seen as a bright spot if its reflectivity is greater than the surrounding water; and either indistinguishable or as a dark area if its reflectivity is equal to or less than the surrounding water. If a target is above the gate, obscuration occurs, and in this case, since the obscuration represents a limiting case (no photons received) the signal to noise ratio is determined by the intensity of the surrounding light backscattered from the water.

Airborne imaging lidar systems fielded to date have been monostatic. In other words, the system's transmitter (laser) and receiver (camera) optics are colocated and coaxial. In a monostatic lidar system, the light scattered back from the gated area returns along the same path as it started from the transmitter. This 180° backscatter occurs at a peak in amplitude, and thus represents a maximum which occurs in backscattered light. This is the optimum arrangement for objects viewed in obscuration. As described in "Marine Optics", N. G. Jerlov, Elsevier Oceanography Series 14, p. 34, Elsevier, N.Y. (1976), this peak in backscattering is symmetric around 180°. The intensity of this backscattering can decrease an order of magnitude at deflections as small as $+/-10°$ from 180°. As a result, the monostatic imaging lidar systems of the prior art are not well suited for imaging a target when viewed in reflection.

SUMMARY OF THE INVENTION

The above-discussed and other problems and deficiencies of the prior art are overcome or alleviated by the imaging lidar system of the present invention which is adapted to decrease the backscattering at the receiver when a target is viewed in reflection and to increase the backscattered reflection when the target is viewed in obscuration by operating the airborne lidar imaging system bistatically in the former case, and monostatically in the latter case. When operating bistatically, the bistatic angle employed should vary between about 0.45° to about 30° (or 179.45° to 150° with respect to monostatic operation at 180°). Preferably, the bistatic angle is about 10° to 20° (or about 170° to 160° with respect to the monostatic angle of 180°).

In accordance with a first embodiment of the present invention, a retractible prism and remote reflecting mirror are used to direct the laser transmitter beam downward. The reflecting mirror is offset so that there is a finite angle between the transmitter optical path and the path of the light reflected back into the CCD framing camera. The angle can be varied by moving the reflecting mirror along a track or rail with the appropriate adjustment to the mirror so that the transmitter beam is completely captured and directed downward to illuminate the area viewed by the camera.

In a second embodiment of the present invention, the camera is placed on runners and displaced from the transmitter beam. A control is inserted so that the transmitter optics are directed to the area imaged by the camera.

In addition, two variations of these two embodiments are provided in which first, the camera optics move in response to the movement of the transmitter beam, and second, the camera optic are directed to view the area illuminated by the laser transmitter as the camera moves away from the location of the transmitter. In all of these preferred embodiments, the platform for the transmitter (and/or receiver) is an airborne system.

Still other embodiments of this invention are presented wherein a discrete vehicle towed by a cable is used to achieve bistatic imaging.

In several of the above-described embodiments, fiber optic communication may be utilized to achieve the required bistatic viewing angles.

The present invention is particularly useful in imaging targets which can be observed in reflection or in obscuration and for which it would be desirable to maximize the ambient backscatter (target in obscuration), or on the other hand, minimize the ambient backscatter (target in reflection). Of course, multiple cameras can be employed so that simultaneous monostatic and bistatic operation can be achieved, providing optimized detection in both reflection and obscuration modes.

The above-discussed and other features and advantages of the present invention will be appreciated and understood by those of ordinary skill in the art from the following detailed description and drawings:

BRIEF DESCRIPTION OF THE DRAWINGS

Referring now to the drawings, wherein like elements are numbered alike in the several Figures.

DESCRIPTION OF THE PREFERRED EMBODIMENT

Figure 1A:
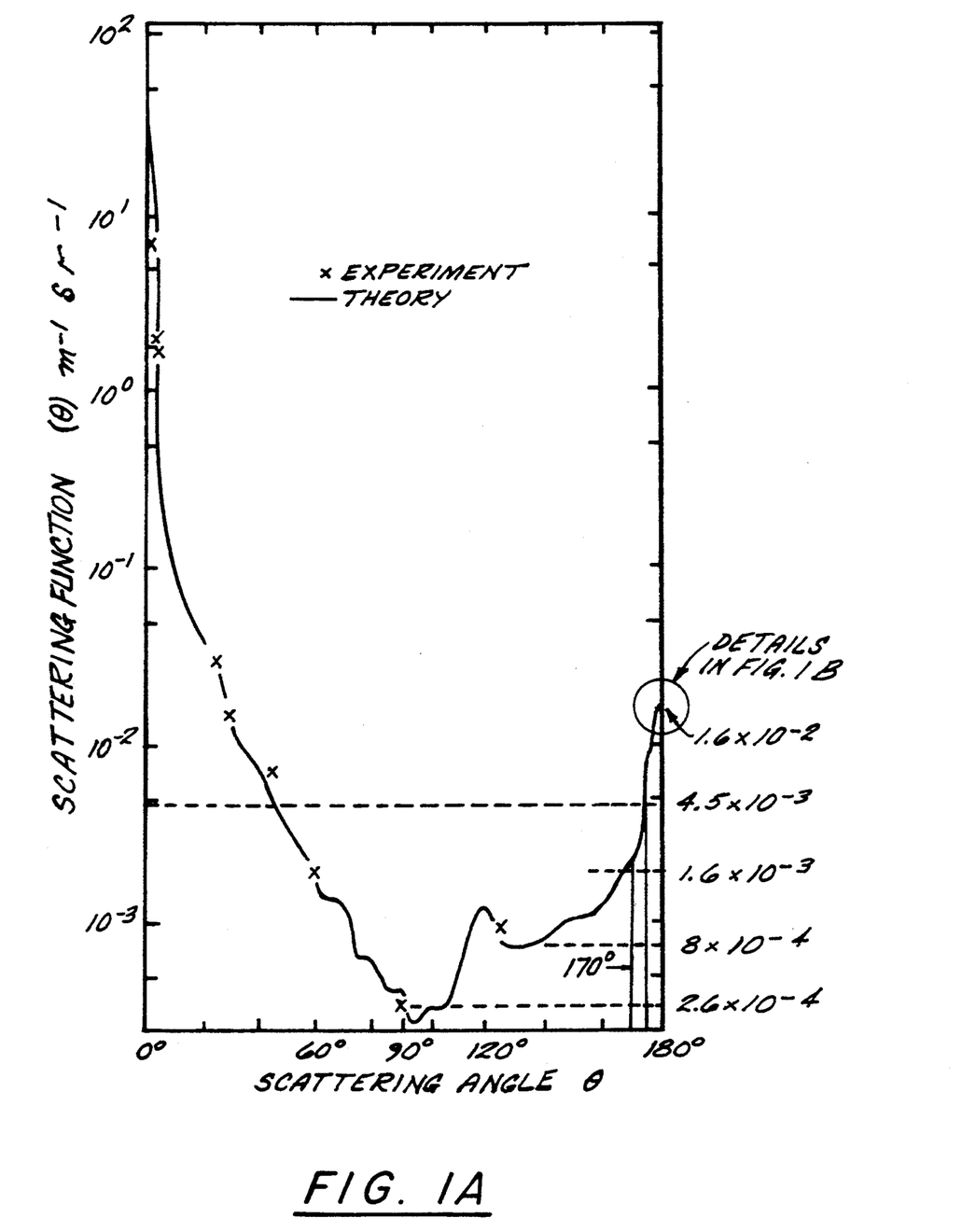
FIG. 1A is a graph depicting the amplitude of volume backscatter as a function of scattering angle.
Figure 2A:
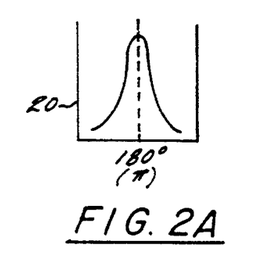
FIGS. 2A and 2B are graphical representations showing backscattered light for a single pulse in respective monostatic and bistatic lidar systems.
Figure 2B:
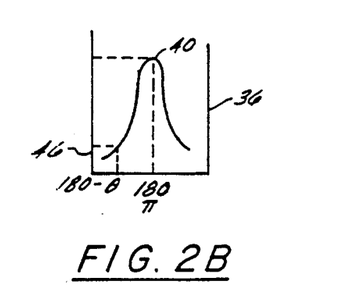

Referring first to FIG. 1A, and in accordance with the present invention, it is shown that to decrease the backscatter by a factor of ten (one order of magnitude) for observation of a target in reflection, the transmitter (e.g., lasers) and receiver (e.g. camera) must be in the bistatic mode with path separations in the water of 10°. For a decrease of a factor of twenty, a path separation of 40° is required. Although theoretically a decrease of close to two orders of magnitude could be obtained with a 90° angle, this would present practical difficulties as will now be discussed with respect to U.S. Pat. No. 3,527,881 to Blanchard. Blanchard discloses a method for imaging underwater objects in which isolated portions of a video screen eliminates "scattering" effects. Such a procedure will not lessen the scattering observed, it can only prevent pixel drain, a far less significant source of noise. Blanchard asserts that the "source target sensor angle" must be ". . . maintained . . . near 90°, which has been determined to be the ideal angular space relationship to obtain minimum backscatter". As discussed, FIG. 1 shows a minimum backscatter point at 90°. But this is for an all underwater system. The practical difficulties in applying this all underwater concept are cited in "Blue-green high powered light extends underwater visibility" Kornstein, E. and Wetzstein, H., Electronics, Oct. 14, 1968 (see Figure on page 147) and on FIG. 2 herein (where a monostatic and bistatic system are shown), with the bistatic system operating at the "ideal" 90° separation of transmitter and receiver. Kornstein et al. state that "bistatic operation is preferable but impractical, so monostatic is used . . . " Kornstein et al. clearly understood the impracticality of attempting to separate transmitter and receiver by 90° which would involve having to move large structures separated by hundreds of feet through the water, with cabling and the requirement to have these units always at the 90° orientation.

Figure 3A:
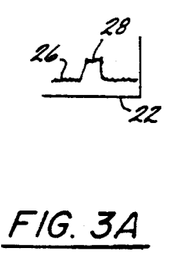
FIGS. 3A to 3D are graphical representations showing backscattered light for a target in reflection for monostatic and bistatic lidar systems, respectively.
Figure 3B:
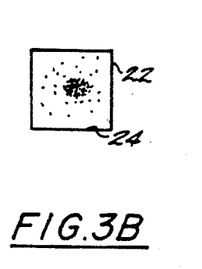
Figure 3C:
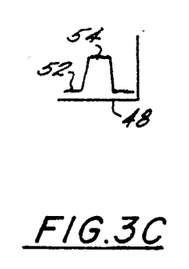
Figure 3D:
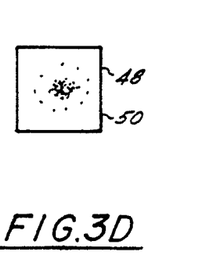

In addition, there are even more serious objections to using the underwater 90°, separation when imaging is done from an above water platform (as in the present invention). This situation is shown in FIGS. 3A and B (and will be discussed in more detail hereinafter). Here, the required underwater orientation of 90° is maintained but, for a narrow beam of light (or for that portion of the transmitter beam and that portion of the target imaged) the angle above the horizontal $\Phi$ must be 19.5°. This is a very shallow angle. Referring again to FIG. 3, from classical optics and assuming a perfectly flat ocean, $$\text{Sin } \Phi = n'/n \text{ Sin } \Phi' \qquad (1)$$

Because of the 90° angle requirement, and to minimize the light path in the water, $\Phi'$ is 45° and Sin $\Phi'=0.707$; n' is the refractive index for water, 1.33 and n is the refractive index for air, 1.00. Then, Sin $\Phi'$ is 1.33(707), and Sin $\Phi$ is 0.94031, and $\Phi'=70.5°$. $\Phi$, the angle of inclination is therefore 19.5°. This is a very low inclination to the surface of the ocean. It has consequences which make the fielding of an airborne laser system imaging a below water object at the 90° angle unworkable.

To indicate the problems which will be encountered, for example, consider the effect of entering the water at an angle of 19.5° from the horizontal. On reentry in the atmosphere, consider the effect of reflection in both cases. On incidence, a light wave entering at 19.5° loses 12% of its energy upon reflection. The light scattered or reflected back from the target from below the surface has a reflectivity governed by the relationship;

$$\frac{R}{E} = \frac{n \cos \Phi' - \cos \Phi}{n \cos \Phi' + \cos \Phi} \approx \frac{n-1}{n+1} \qquad (2)$$

In the case of water, with a 90° angle at depth, and the 19.5° entrance and exit angle, the loss upon entry can be from 4.7 to 21.9%, depending on the polarization, as compared to 2% for monostatic operation. Internal reflection is high, since the 45° exit angle is close to the critical angle for total internal reflection of 48.5% and losses at around 60%. This analysis, of course, assumes a perfectly flat sea. When the sea is not flat, further losses can occur such as shadowing, reflection, total internal reflection, defocussing and absorption. These effects become dominant at small inclinations. The effects of sea state on optical transmission are shown in Table 1. A normalized Cox-Munk wave spectrum was used, and sea state 1 and 3 were chosen for comparison. In this calculation, the effects of indirect illumination were not considered, and are dealt with hereinafter.

TABLE I

| Angle from vertical;<br>Lidar Transmitter<br>and Receiver, deg. | Normalized Signal | |
|---|---|---|
| | Sea State 1 | Sea State 3 |
| 0 | 1.0 | 1.0 |
| 20 | 0.74 | 0.62 |
| 40 | 0.33 | 0.26 |
| 60 | 0.16 | 0.068 |
| 70 | 0.083 | 0.03 |
| 80 | 0.053 | 0.014 |

The statement has been made in the Blanchard patent that 90° is the optimum angle for bistatic operation. However, under the ocean as well as above, the imposition of a 90° illumination angle can create problems. This case is analogous to the problem of the illumination of the moon's surface by the sun. It can be readily recognized that the half moon is not half as bright as the full moon. This is because when a Lambertjan reflective sphere is illuminated, the reflected light as viewed at increasing angles decreases progressively from a nominal value of 1.0 at opposition to a value of $1/\pi$ at 90°.

This results in a large loss of reflected signal when operating at the "optimum" angle of 90°. The analysis for this case has been done and these results are shown in Table II.

Figure 1B:
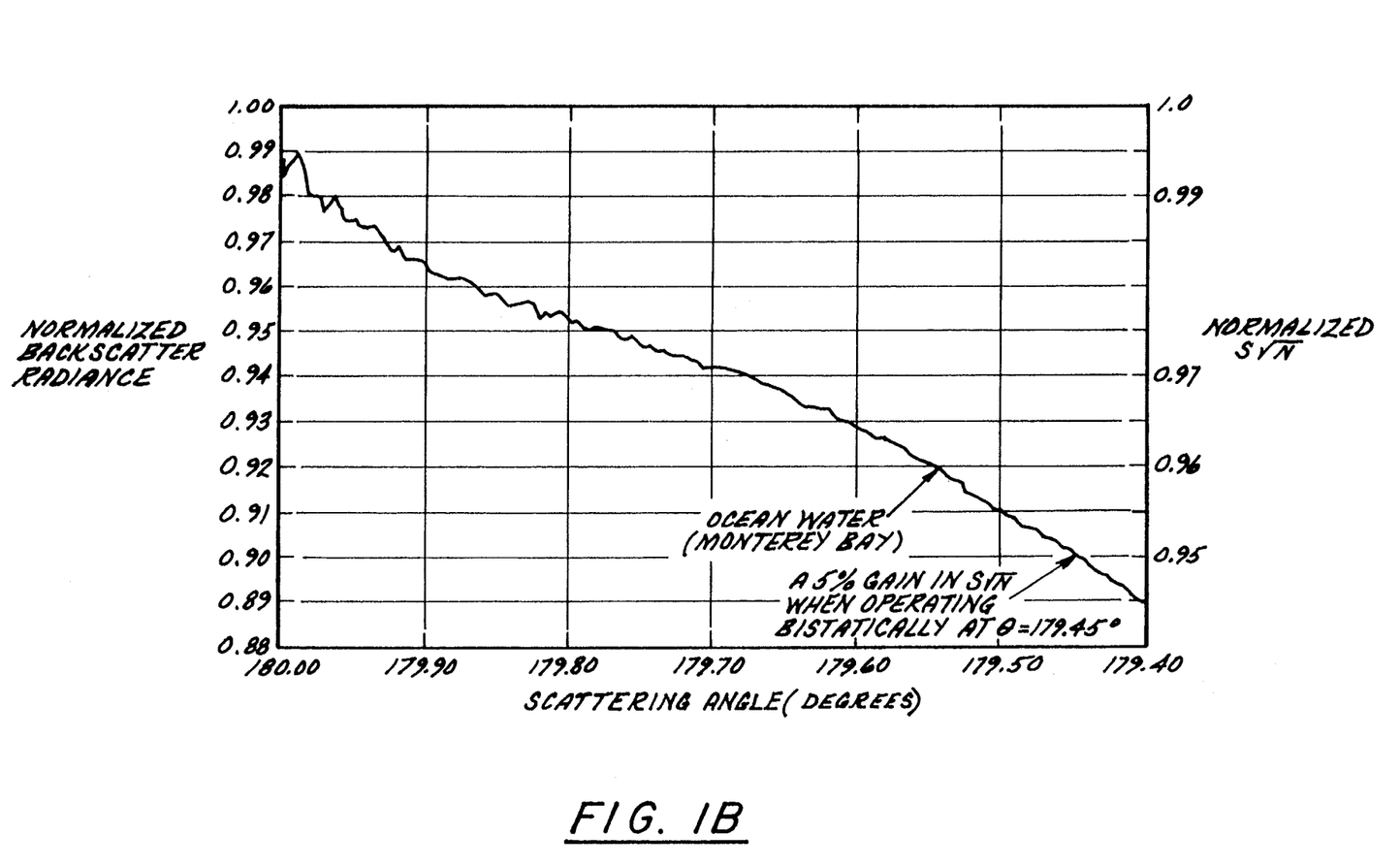
FIG. 1B is a graph depicting an enlarged portion of FIG. 1A.

FIG. 1A shows the effect of intensified backscattering on the noise present in imaging a target of a given reflectivity. If $S/(N)^{\frac{1}{2}}$ is normalized to be 1.0 at 180° the $S/(N)^{\frac{1}{2}}$ at 175° will be 1.88, and the $S/(N)^{\frac{1}{2}}$ at 170° will be 3.16. This assumes that S does not change significantly with angle away from the nadir, which will be verified in FIG. 13. The Mie scattering peak shown in detail in FIG. 1B, indicates that bistatic operation in accordance with the present invention begins to be useful at an angle of about 179.45°, where the $S/(N)^{\frac{1}{2}}$ has increased by 5%. At 90°, as shown in FIG. 1 the noise (backscattering) has decreased to $2.6 \times 10^{-4}$; hence if the signal had remained constant, $S/(N)^{\frac{1}{2}}$ would have increased to a value of around 8. But as discussed above, the signal does not remain constant with increasing angle of bistatic operation.

To illustrate this in tabular and graphic form, the signal and noise are normalized to 1.0 for monostatic operation. Note that for purposes of the present invention, monostatic operation corresponds to 180° for backscattering noise, and 0° for transmitter beam, and receiver optics inclination to the ocean surface. Table III gives the results for state 1 and state 3 seas. The overall $S/(N)^{\frac{1}{2}}$ is the product of S (target reflectivity with illumination angle) times S (signal at inclination to the ocean) times the noise of backscatter. Thus, $$S/(N)^{\frac{1}{2}} \text{ overall} = S_{\text{illumination}} S_{\text{sea state}} S/(N)^{\frac{1}{2}}$$

Figure 13:
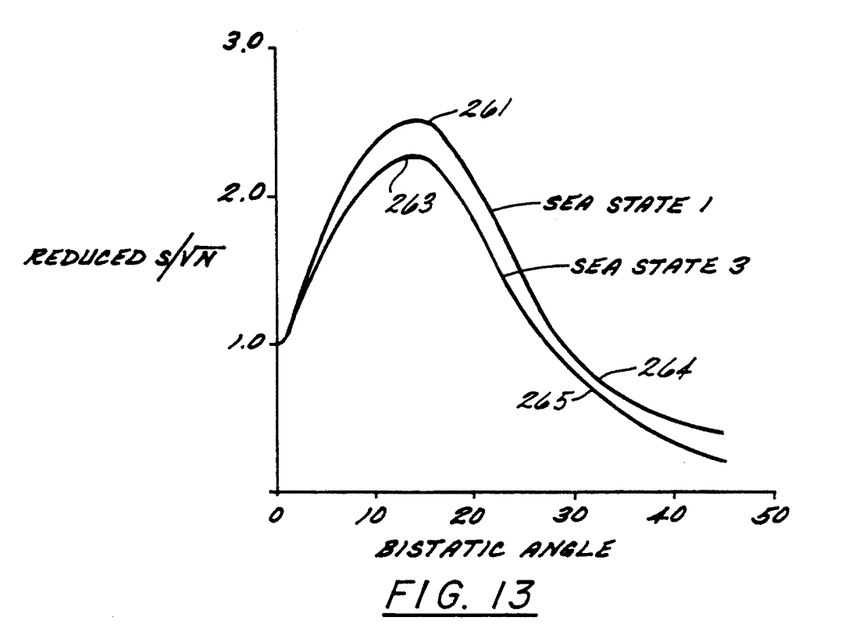
FIG. 13 is a graph of reduced noise versus bistatic angle.

This is shown in Table II and FIG. 13. It can be seen that the advantage of bistatic operation peaks at around 10°–20° and at greater than 20° the bistatic is less advantageous. Thus, the bistatic operation of the present invention can be defined by a bistatic angle of about 0.45° to substantially less than 90°, actually about 30°. Preferably, the bistatic range is about 10° to 20°. In other words, the bistatic angle is in the range of about 179.45° to 150° with respect to the monostatic angle of 180°; and preferably in the range of about 170° to 160°.

TABLE II

| Angle,° | Light Reflected, I(α) | l₁₀Lᵣ |
|---|---|---|
| 0 | π (3.14) | 0.00 |
| 22½ | 2.90 | −0.39 |
| 45 | 2.38 | −0.62 |
| 67½ | 1.60 | −0.85 |
| 90 | 1.00 | −1.23 |

TABLE III

| Angle from vertical<br>Lidar Transmitter<br>Receiver, deg. | Bistatic<br>Angle in Water | S/(N overall)^½ | |
|---|---|---|---|
| | | Sea State 1 | Sea State 3 |
| 0 | 0 | 1.0 | 1.0 |
| 20 | 14 | 2.51 | 2.27 |
| 40 | 28 | 1.1 | 0.89 |
| 60 | 45 | 0.4 | 0.2 |
| 70 | 45 | — | — |
| 80 | 48.6 | | |

Figure 12:
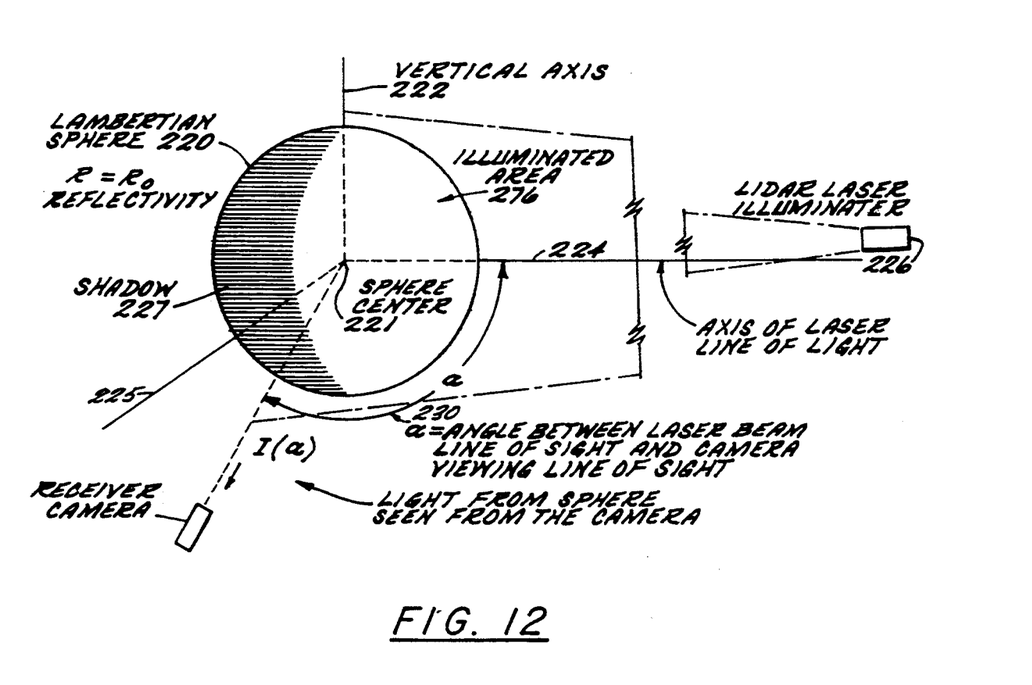
FIG. 12 is a diagrammatic view of the bistatic lidar illumination of a lambertjan reflecting sphere.

Referring now to FIG. 12, a spherical Lambertjan reflection 220 oriented with coordinates at the sphere center 221, vertical axis 222 and two horizontal axes 224 and 225. The sphere 222 is illuminated by a lidar transmitter 226 with light transmitted toward the sphere along axis 224. This light produces an illuminated area 226 on the sphere. The shadow 227 is the half of the sphere which is not illuminated by the laser 226. The receiving camera is positioned in the plane determined by axes 225 and 224. The angle $\alpha$ is the angle between the laser beam axis and the orientation of the imaging camera. If the Lambertjan reflectivity is $R_o$, the light seen by the camera is given by Equation 3.

$$I(\alpha) = \tfrac{1}{3} R_o [\sin \alpha + (\pi - \alpha) \cos \alpha] \qquad (3)$$

The dependence of $I(\alpha)$ on $\alpha$ is shown in Table II. The decrease of light received by the camera by a factor of $1/\pi$ at $\alpha = 90°$ is $\simeq 1.6$ times greater than would be expected based on the ratio of illuminated area viewed at $\alpha = 0$ to the area viewed at $\alpha = 90$. The magnitude of the signal is decreased by a factor of $\pi$ by operating at the angle of 90°.

Referring to FIG. 13, the results of Table III are presented. It can be seen that the optimum angles for bistatic operation are at 261, for a state 1 sea and 263 for a state 3 sea. The limits of effectiveness of bistatic are the intersection of the curves for the two sea states with the $S/(N)^{\frac{1}{2}} = 1$ axis. At these angles 264, 265 the $S/(N)^{\frac{1}{2}}$ ratio has decreased to 1 and there is no advantage to increasing the bistatic angle. By 90° the $S/(N)^{\frac{1}{2}}$ is miniscule.

In addition to the maximum shown in FIG. 1A, additional effects can also be present over angles close to 180°, but the presence of such effects does not alter the qualitative performance of the present invention.

Figure 4A:
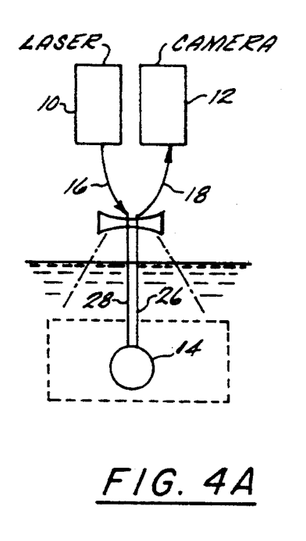
FIGS. 4A and 4B are schematic diagrams of monostatic and bistatic imaging lidar systems, respectively.
Figure 4B:
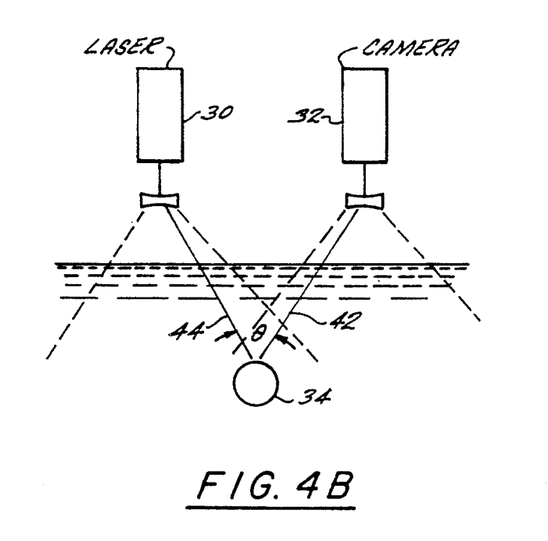
Figure 5A:
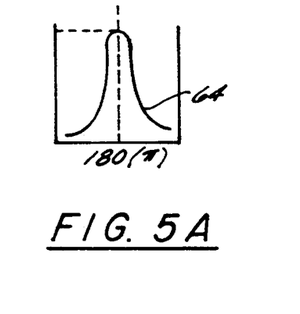
FIGS. 5A and 5B are graphical representations showing backscattered light for a single pulse in obscuration for monostatic and bistatic lidar systems, respectively.
Figure 5B:
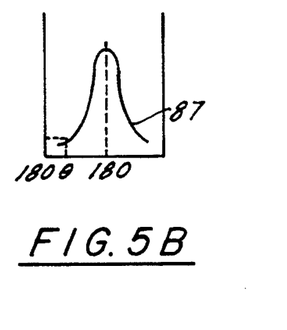
Figure 6A:
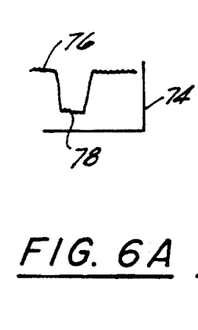
FIGS. 6A to 6D are graphical representations of the target signatures of FIGS. 5A and 5B, respectively, shown on a video frame.
Figure 6B:
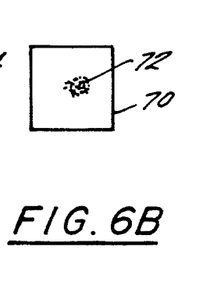
Figure 6C:
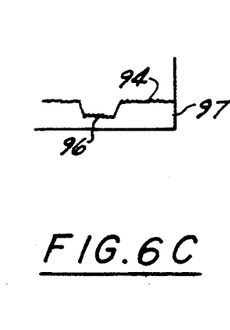
Figure 6D:
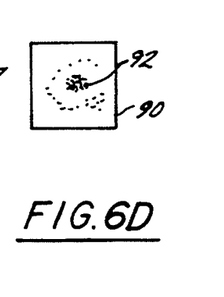
Figure 7A:
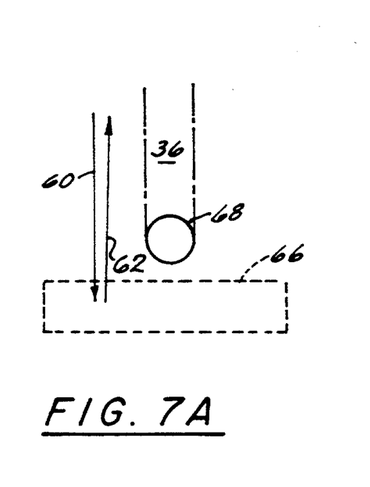
FIGS. 7A and 7B are schematic diagrams depicting the light paths for the respective targets of FIGS. 5A and 5B.
Figure 7B:
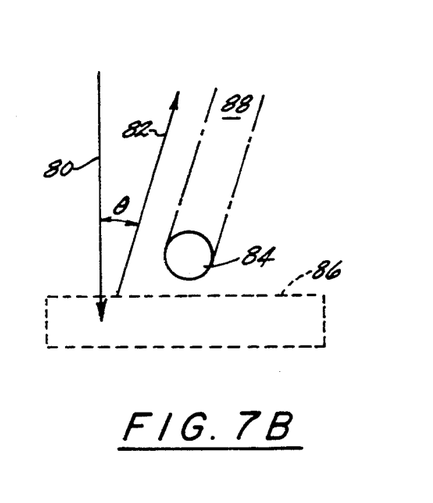

Referring to FIGS. 2A–B, 3A–B and 4A–B, the effects of separating the transmitter and receiver are shown wherein two lidar systems are seen operating side by side in a monostatic mode (FIGS. 2A, 3A and 4A) and a bistatic mode (FIGS. 2B, 3B and 4B). In FIGS. 2A, 3A and 4A, the lidar system with pulsed laser transmitter 10 and rated intensified charge coupled device (ICCD) camera 12 (FIG. 4A) is illuminating and viewing a target 14 underneath the ocean surface. The illuminating light 16 and returned light 18 are coaxial; that is, the scattering angle of the returned light is 180° (with respect to the Zenith direction). FIG. 2A is a graph 20 taken from FIG. 1A, showing that the light backscattered from the ocean surrounding the target is at a maximum, and this is reflected in trace 22 across one of the video frames 24 (see FIG. 3A) from the illumination of target 14 by a single pulse. The trace 22 taken across this video frame 24 shows a level of "noise" 26 representing return from the sea water, and a "signal" 28 representing return from the target.

Referring now to FIGS. 2B, 3B and 4B, the bistatic system consists of a separately located laser transmitter 30 and camera 32. A target 34 is shown at the same depth and is physically identical to target 14. The effect of the separation of camera 32 and laser transmitter 30 is shown in the graph 36 (FIG. 2B). Light 38 scattered back from the illuminated area toward the transmitting laser is at the same intensity as the light received at the camera of the monostatic system, and this is shown as point 40 on graph 36. However, the light received at the bistatic camera returning along path 42 at an angle $\Phi$ from the path 44 of the light transmitted downward is of lower intensity, as represented by the point 46 on graph 36. A trace 48 across the video frame 50 corresponding to this situation (FIG. 3B) shows a decreased "noise" level 52 and a "signal" 54 which is comparable to the signal 28 which was coaxial with the illuminating light beam in the monostatic case (see FIG. 3A). The reason that signals 54 and 28 are roughly equal in magnitude is that the target is a diffuse lambertjan reflector. If the target had been a specular reflector of high reflectivity (e.g., a mirror) directed back at the transmitters 10 and 30, the signal 28 would have been relatively intense, but the signal 54 would have been negligible. Note also that in accordance with this invention, the bistatic system (FIG. 4B) can be configured so that the laser transmitter 30 illuminates the same volume viewed by the camera 32 (as best shown in FIG. 9).

Referring to FIGS. 5A–B, 6A–B and 7A–B, a comparison between the monostatic (FIGS. 5A, 6A and 7A) and bistatic (FIGS. 5B, 6B and 7B) imaging of targets in obscuration is shown. In the case of monostatic operation, the transmitted light 60 and backscattered light 62 are coaxial; that is, the light 62 returns to the camera along the same path that the pulsed illuminating light 60 arrived. Thus, the scattering angle is 180°. This is the point for maximum scattering return from the ocean as shown by the graph 64 in FIG. 5A. The ICCD camera gate is timed to observe the volume 66 which is below the object 68 to be observed. Thus, the object 68 is seen in obscuration, since all light which would have returned from the imaged area 66 to the camera, and passing through the target will be blocked or obscured. This appears on the video screen 70 as a dark spot 72 which is highlighted by the surrounding backscatter originating from that part of 66 not obscured by the target above it. The trace 74 is plotted showing the surrounding "noise" 76 and signal 78. In this instance, contrast is provided by the value of the surrounding backscattered light, so that in this case the noise becomes the signal and the signal is merely the absence of noise. For the bistatic case, (FIGS. 5B, 6B and 7B), the backscatter available to provide contrast with the absence of signal from the obscured region is reduced thereby decreasing the effective "signal" to "noise" ratio. In this bistatic case, the pulsed laser illumination 80 illuminates the area imaged by the ICCD camera. The light returns at 82 to the camera which is now no longer coaxial with the pulsed laser transmitter. The angular separation of the light rays is $\Phi$. The light which would have returned to the camera through the space now occupied by the target 87 is obscured. An obscuration volume 86 results similar to 66 in the monostatic case. As can be seen from referring to graph 86, the intensity of the backscatter is reduced, providing lesser contrast with the shadow area caused by the obscuration 88. This can be seen on the video frame 90. A scan 97 across this frame shows the ambient backscatter 94 decreased, while the signal level 96 which is associated with the target obscuration remains relatively constant roughly equivalent to 78.

Figure 8:
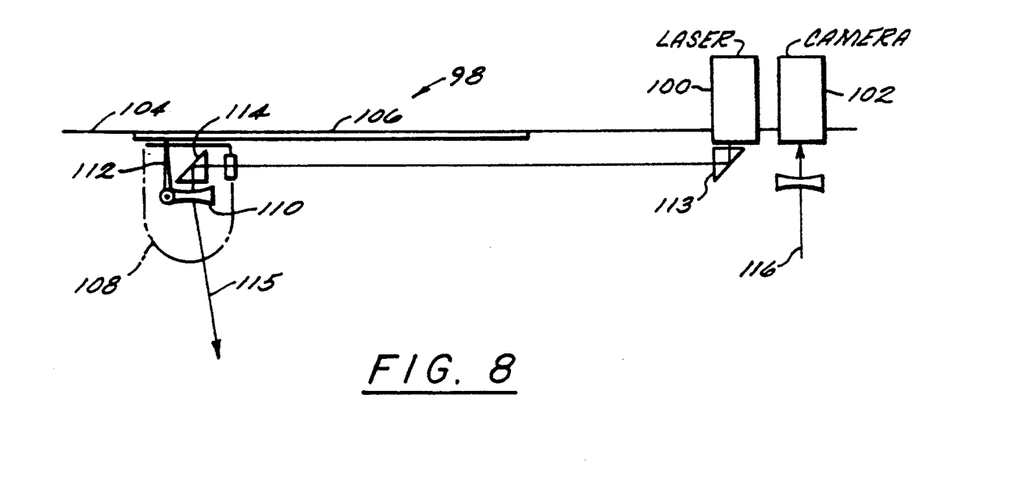
FIG. 8 is a schematic diagram of an imaging lidar system capable of both monostatic and bistatic operation.

Referring to FIG. 8, a first preferred embodiment for achieving bistatic configuration for an imaging lidar system is shown generally at 98 wherein the transmitter and receiver are mounted for monostatic (coaxial) sensing; with the addition of a movable mirror to alter the trajectory of the pulsed light rays from the transmitter. The pulsed laser transmitter 100 and ICCD camera 102 are mounted on an aircraft airframe 104. A rail 106 is provided for a housing 108 of a turning prism and output beam steering optics 110 (e.g. mirror) so that the location of the effective origin of the output pulse can be varied. A control coupling 112 for the output optics is provided with input from the aircraft altimeter, so that the pulsed laser transmitter can continue to illuminate the volume of the ocean viewed by the ICCD camera, as altitude and distance between transmitter and receiver are varied (see U.S. patent application Ser. No. 420,247 which has been incorporated herein by reference). The transmitted light pulses are initially directed away from a 180 degree trajectory by a first prism 113 and then directed to beam steering optics 110 by a second prism 114. The redirected output beam 115 is transmitted downwardly and returns to the camera 102 as the backscattered pulse 116. Of course, housing 108 is movable and steering optic 110 is pivotable to alter the trajectory of the transmitted pulsed light as desired. Moreover, the mirror 113 may be removed or disengaged to permit conventional coaxial (monostatic) operation.

Figure 9:
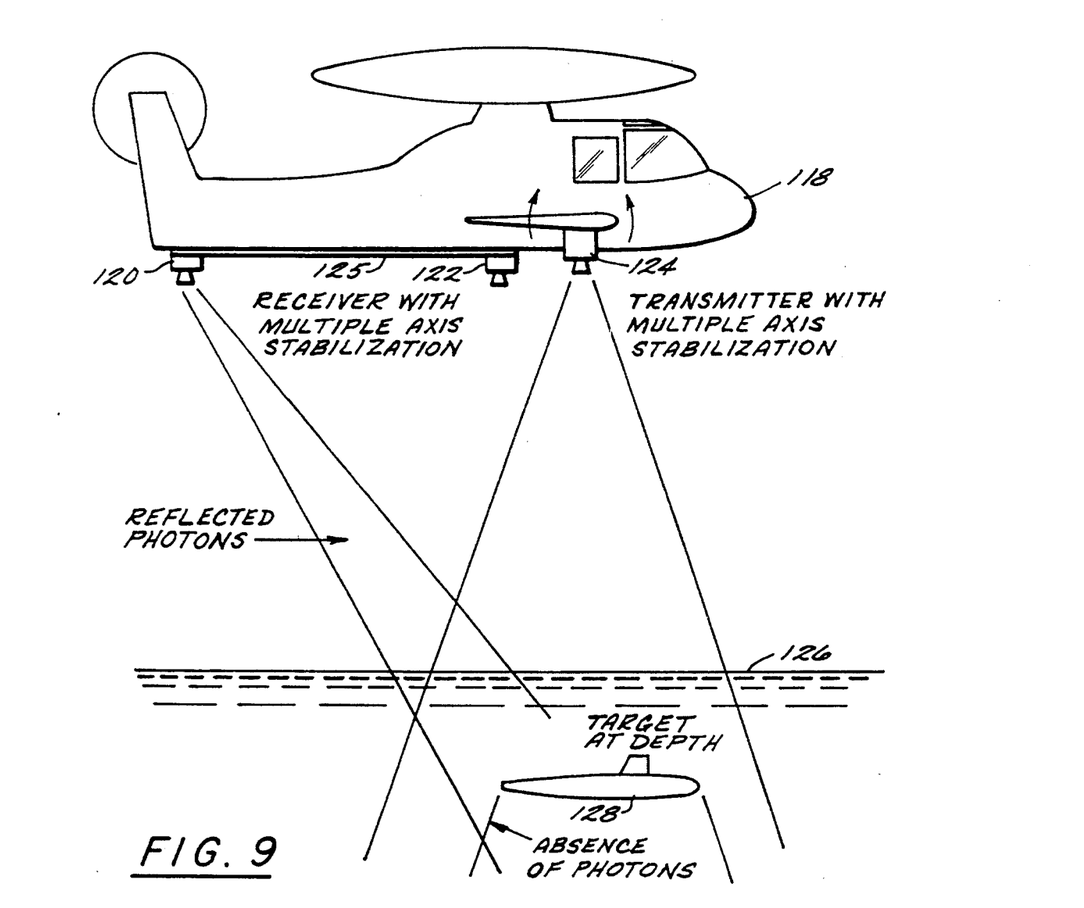
FIG. 9 is a diagrammatic view of an alternative embodiment of the imaging lidar system of the present invention installed on a helicopter.

Turning now to FIG. 9, alternative arrangements for both bistatic and monostatic imaging lidars are shown mounted on a helicopter 118. In a first of these embodiments, a pair of spaced receivers 120 and 122 are used in conjunction with a transmitter 124 wherein receiver 120 is used in a bistatic mode and receiver 122 is used in a monostatic mode. As discussed in detail above, the bistatic arrangement may be useful for detecting targets in reflection. In this configuration the camera 120 is physically separated in the horizontal plane from the laser beam projection optics 124 and their relative lines of sight are tilted to intersect at the target search depth. In this case, the volume backscatter angle is not 180° (with respect to the zenith direction) but is less than 180°. The result will be appreciably reduced backscatter light levels from the water 126 volume but no reduction in the target 128 reflection intensity. Thus, the SNR will be improved by avoiding the strong peaking of light backscatter at 180°. As also mentioned, for shadow detection, the coaxial mode (180°), and hence camera 122, are preferred since this gives the highest SNR for that mode. Thus, the system of FIG. 9 employs two sets of cameras 120, 122, one camera (e.g., 122) near the laser for optimized shadow detection and one camera (e.g., 120) separated for optimum reflection detection. Also, and for increased flexibility, camera 120 may be mounted on rails or rollers 125 so that it will be movable in the horizontal direction and the distance between transmitter 124 and camera 120 may be easily varied. In still another alternative embodiment, camera 122 may be removed and only movable camera 120 used. Camera 120 would then be movable between a first position coaxial with transmitter 124 (monostatic) and a plurality of second positions horizontally displaced from transmitter 124 (bistatic).

In addition, the transmitter 124 and receivers 120, 122 are compensated in the three aircraft axes for roll, pitch and yaw during flight, thereby maintaining a constant, boresighted angular relationship between the transmitter, receiver and the target area of interest. This method will compensate for changes in aircraft flight conditions as well as for external factors such as wind gusts. A preferred compensating system is disclosed in FIG. 3 of U.S. Ser. No. 565,631 (which has been incorporated herein by reference).

Figure 10:
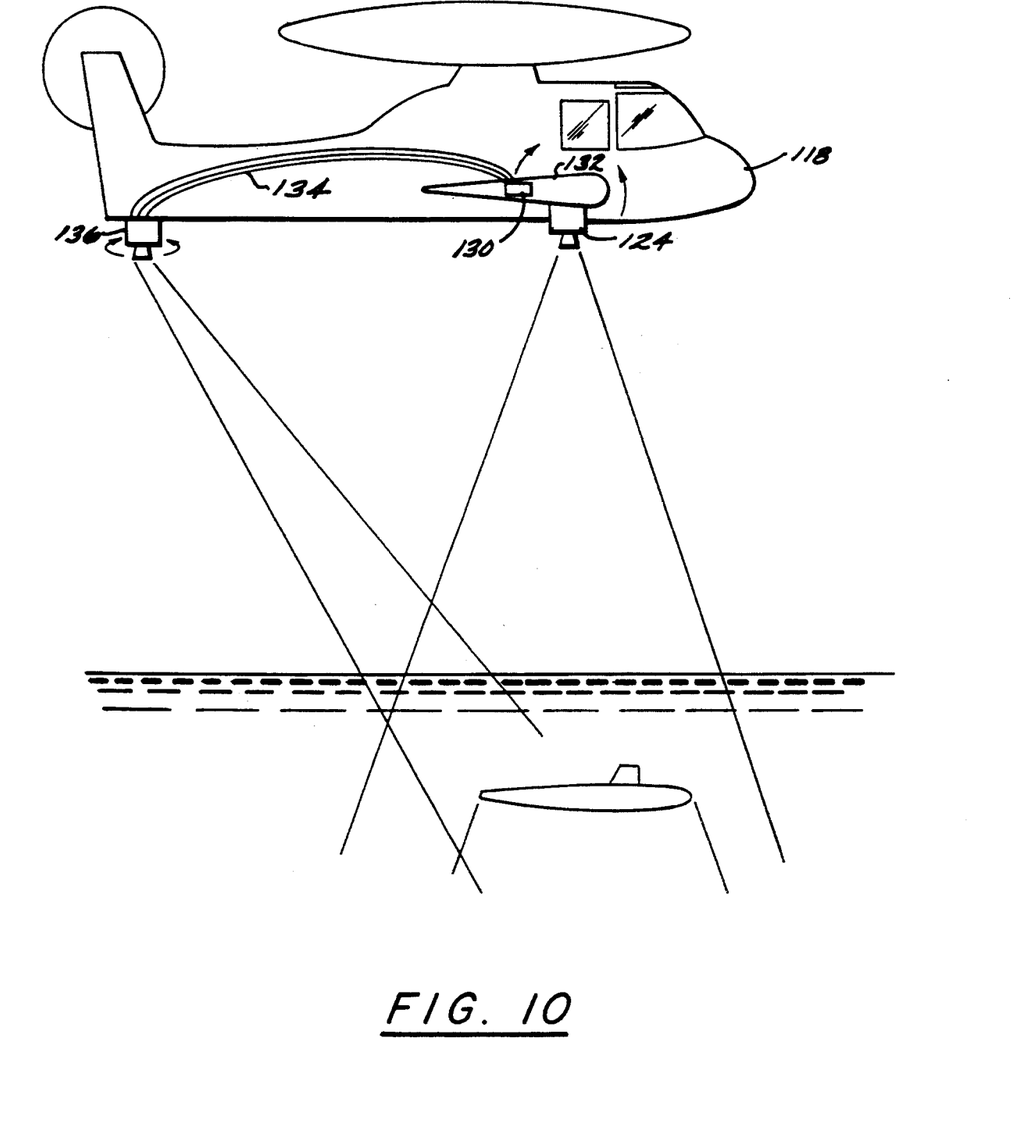
FIG. 10 is a diagrammatic view of still another embodiment of this invention which employs fiber optic communication.

In still another alternative embodiment shown in FIG. 10, the electronics 130 for the gated camera are mounted near the laser transmitter 124 in the lidar system housing 132. When bistatic viewing is desired, a bundle of optical fibers 134 terminating at horizontally displaced receiving optics 136 is used to transmit received pulses of light to the lidar system camera sensor for detection. Of course, fiber optics may also be used conversely. In this latter case, element 136 comprises a projector; element 130 comprises the laser transmitter and element 124 comprises the receiver. Thus, the transmitter 130 will transmit pulses of light along at least one optical fiber 134 for projection downwardly through projection optics 136. Reflected pulses will then be received by receiver 124.

Figure 11:
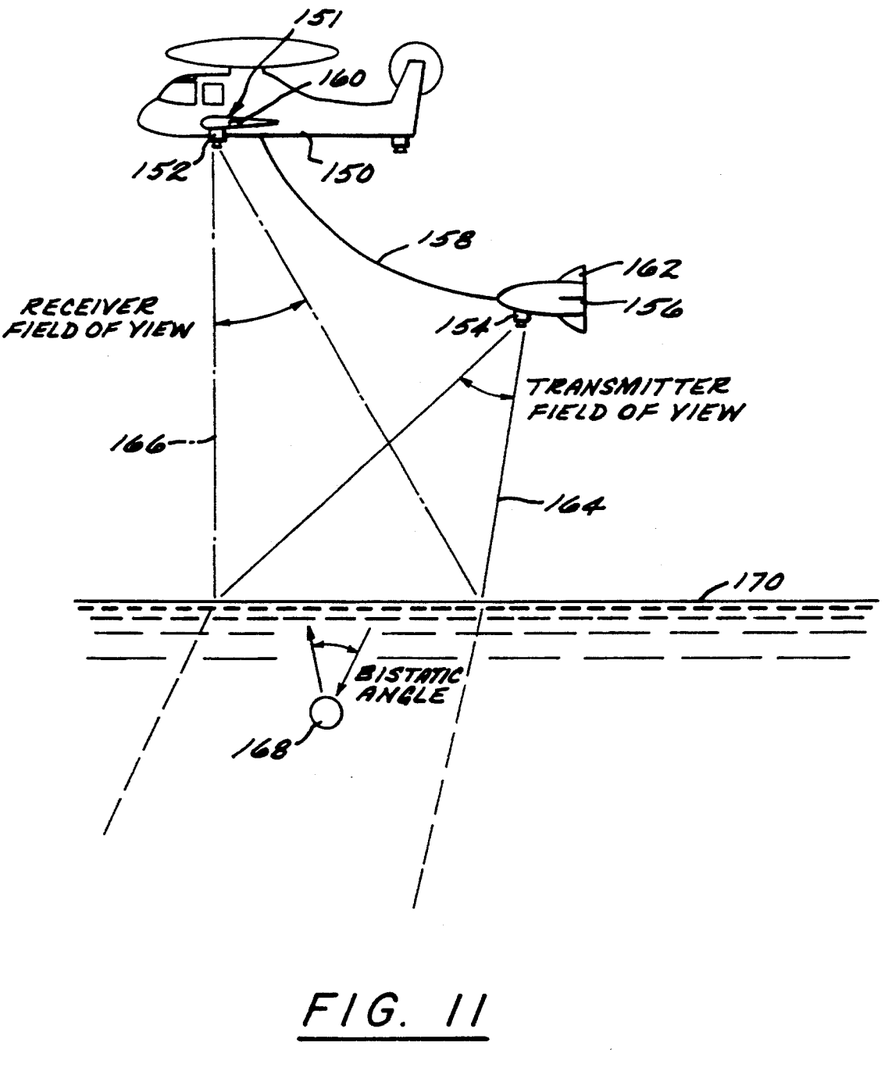
FIG. 11 is a diagrammatic view of yet another embodiment of this invention which employs a discrete vehicle towed by a cable.

Referring now to FIG. 11, still two additional embodiments of the present invention are schematically shown. In a first of these additional embodiments, the airborne platform 150 (i.e., helicopter) includes a lidar system 151 having gated camera receiver 152 conventionally positioned for 180 degree viewing. In accordance with the present invention, the pulsed laser projector 154 is displaced horizontally from receiver 152 which is housed in a discrete vehicle 156 pulled along by platform 150 using a suitable cable 158. Vehicle 156 may be towed by platform 150 through the air or under water 170. Preferably, the pulsed laser transmitter 160 is actually housed in lidar system 151 with an optical fiber running along cable 158 so as to optically interconnect transmitter 160 to projector 154. Fins 162 are provided on vehicle 156 for stabilization purposes. As is clear from a review of FIG. 11, the towed transmitter vehicle 166 will provide a field of view 164 which is angled (when compared to the field of view 166 provided by receiver 152) so as to result in the lidar system 151 viewing the target 168 (under water 170) at a bistatic angle.

In a second embodiment of these alternative embodiments, element 152 comprises a pulsed laser transmitter and element 160 comprises the gated camera electronics with a bundle of optical fibers running along cable 158 to receiving optics 154 on towed vehicle 156.

In still other variations of the embodiments of FIG. 11, the actual pulsed laser transmitter or gated camera receiver may be housed in the towed vehicle 156 (thus, element 154 would function either as a transmitter or receiver). Communication between computer control means in the lidar system 151 on airborne platform 150 and either of the transmitter 154 or receiver 154 on vehicle 156 may be accomplished by any known hardwired technique (e.g., along towing cable 158) or wireless technique (e.g., radio waves).

It will be appreciated that the imaging lidar systems depicted in FIG. 11 are novel not only in providing a means of accomplishing bistatic operation; but also in their overall configuration wherein either the transmitter means or receiver means are housed in a discrete vehicle towed by the airborne platform and wherein optical fibers may be used to optically interconnect the lidar system 151 to devices housed in vehicle 156.

It will be appreciated that a lidar imaging system that has been described above has been described with improved ability to image undersea targets, and provide a better signal to noise ratio and probability of detection. Of course, any desired imaging lidar system may be employed including systems incorporating multiple lasers, multiple cameras, etc.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for detecting and imaging an object enveloped by water from an airborne platform comprising:

transmitter means mounted on an airborne platform for selectively generating pulses of light;

projecting means for projecting said pulses of light toward the water at an object enveloped by the water;

receiver means for receiving said pulses of light reflected back from said object after a time delay corresponding to the round-trip propagation time of said light pulses to and from said object; and converting means for converting said received pulses of light to a video image of said object;

said receiver means being positioned at a first location to receive said pulses of light reflected back from said object at an angle which is in the range of 179.45° to 150° relative to said projected light pulses.

2. The apparatus of claim 1 wherein said angle is about 160° to about 170°.

3. The apparatus of claim 1 wherein said receiver means includes:

moving means for moving said receiver means between said first location and a second location displaced horizontally from said first location.

4. The apparatus of claim 1 wherein said receiver means includes at least one first gated camera at said first location and further including:

at least one second gated camera at a second location displaced horizontally from said first location wherein at said second location, said second camera means receives said reflected pulses of light at an angle which is 180°.

5. An apparatus for detecting and imaging an object enveloped by water which is at least partially transmitting to light comprising:

transmitter means mounted on an airborne platform for selectively generating pulses of light;

projecting means for projecting said pulses of light toward the water and at an object enveloped by the water;

receiver means for receiving said pulses of light reflected back from said object after a time delay corresponding to the round-trip propagation time of said light pulses to and from said object; and converting means for converting said received pulses of light to a video image of said object;

said projecting means being positioned at a first location to project said pulses of light at an angle which is in the range of 179.45° to 150° relative to pulses of light received by said receiver means.

6. The apparatus of claim 5 wherein said angle is 160° to 170°.

7. The apparatus of claim 5 wherein said projecting means includes:

light bending means for altering the trajectory of said pulses of light, said light bending means being displaced in a horizontal direction from said transmitter means, said light bending means receiving said pulses of light from said transmitter means and projecting said pulses of light toward said backscattering medium.

8. The apparatus of claim 7 wherein:
said light bending means is movable in said horizontal direction.

9. The apparatus of claim 7 wherein:
said light bending means is pivotable to vary said angle of 179.45° to 150°.

10. The apparatus of claim 7 wherein:
said light bending means comprises prism means.

11. The apparatus of claim 7 including:
mirror means in the optical path between said transmitter means and said projecting means, said mirror means directing the light pulses from said transmitter means to said projecting means.

12. The apparatus of claim 11 wherein:
said mirror means is removable from said optical path so that said transmitter means will bypass said projecting means and said pulses of light will travel at an angle of 180° degrees.

13. An imaging lidar apparatus positioned on an airborne platform for detecting and imaging an object enveloped by water, the imaging lidar apparatus including light pulse generating means and reflected light pulse detection means for detecting backscattered reflection from the object and volume backscatter from the water and further including:

means for decreasing said volume backscatter at said detection means when said object is viewed in reflection wherein said imaging lidar apparatus operates bistatically at a bistatic angle in the range of 179.45° to 150°.

14. The apparatus of claim 13 including:
means for increasing said volume backscatter at said detection means when said object is viewed in obscuration wherein said imaging lidar apparatus operates monostatically.

15. A method for detecting and imaging an object enveloped by water comprising the steps of:

selectively generating pulses of light from an airborne platform;

projecting said pulses of light toward the water and at an object enveloped by the water;

receiving said pulses of light reflected back from said object after a time delay corresponding to the round-trip propagation time of said light pulses to and from said object using a receiver means; and converting said received pulses of light to a video image of said object;

positioning said receiver means at a first location to receive said pulses of light reflected back from said object at an angle which is in the range of 179.45° to 150° relative to said projected light pulses.

16. The method of claim 15 wherein said positioning step comprises:

transmitting said received pulses of light along at least one fiber optic cable, said cable terminating at one end at a location displaced horizontally from the location where said pulses are projected.

17. A method for detecting and imaging an object enveloped by water comprising:

selectively generating pulses of light from an airborne platform using light pulse generating means;

projecting said pulses of light toward the water and at an object enveloped by the water using projecting means;

receiving said pulses of light reflected back from said object after a time delay corresponding to the round-trip propagation time of said light pulses to and from said object; and converting said received pulses of light to a video image of said object;

said projecting means being positioned at a first location to project said pulses of light at an angle which is in the range of 179.45° to 150° relative to said pulses of light received by said receiver means.

18. The method of claim 17 including:

transmitting said generated pulses of light along at least one fiber optic cable, said cable running between said light pulse generating means and said projector means, said light pulse generating means and said projector means being horizontally displaced.

19. A method for detecting and imaging an object enveloped by water, the method employing an imaging lidar apparatus mounted on an airborne platform including light pulse generating means and reflected light pulse detection means for detecting backscattered reflection, said backscattered reflection including volume backscattering and further including the step of:

decreasing said volume backscatter at said detection means when said object is viewed in reflection wherein said imaging lidar apparatus operates bistatically at a bistatic angle in the range of 179.45° to 150°.

20. The method of claim 19 including:

increasing said volume backscatter at said detection means when said object is viewed in obscuration wherein said imaging lidar apparatus operates monostatically.

* * * * *